US009829625B2

(12) United States Patent
Homma

(10) Patent No.: US 9,829,625 B2
(45) Date of Patent: *Nov. 28, 2017

(54) OPTICAL FIBER

(71) Applicant: SUMITOMO ELECTRIC INDUSTRIES, LTD., Osaka-shi, Osaka (JP)

(72) Inventor: Yuya Homma, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,687

(22) Filed: May 2, 2016

(65) Prior Publication Data

US 2017/0003446 A1  Jan. 5, 2017

(30) Foreign Application Priority Data

May 8, 2015 (JP) ................. 2015-095987

(51) Int. Cl.
G02B 6/036 (2006.01)
G02B 6/028 (2006.01)
G02B 6/02 (2006.01)
C03C 25/10 (2006.01)
G02B 1/14 (2015.01)

(52) U.S. Cl.
CPC ........ G02B 6/0288 (2013.01); C03C 25/1065 (2013.01); G02B 1/14 (2015.01); G02B 6/02395 (2013.01)

(58) Field of Classification Search
CPC .. G02B 6/02395; G02B 6/028; G02B 6/0288; G02B 1/14; C03C 25/1065
USPC ................. 385/123, 124, 126–128
See application file for complete search history.

(56) References Cited

U.S. PATENT DOCUMENTS

| 6,775,443 | B2 * | 8/2004 | Bringuier | G02B 6/4495 385/100 |
| 8,189,978 | B1 | 5/2012 | Bennett et al. | |
| 2007/0100039 | A1 * | 5/2007 | Hancock | C08F 283/00 524/186 |
| 2011/0217011 | A1 * | 9/2011 | Bennett | G02B 6/0288 385/124 |

(Continued)

FOREIGN PATENT DOCUMENTS

EP  1 070 682 A1  1/2001
JP  3518089 B2  4/2004

(Continued)

Primary Examiner — Robert Tavlykaev
(74) Attorney, Agent, or Firm — Drinker Biddle & Reath LLP

(57) ABSTRACT

An optical fiber comprises a glass fiber which comprises a core and a cladding, a primary resin coating layer which covers the periphery of the glass fiber, and a secondary resin coating layer which covers the periphery of the primary resin coating layer. The glass fiber is a multimode fiber having a core diameter of 40-60 μm and a cladding diameter of 90-110 μm, and the primary resin coating layer is a layer formed by curing a curable resin composition which comprises oligomers, monomers, and a reaction initiator, the curable resin composition containing a one-end-capped oligomer in an amount of 30% by mass or larger based on all the oligomers.

7 Claims, 4 Drawing Sheets

(56) References Cited

U.S. PATENT DOCUMENTS

2013/0071115 A1\* 3/2013 Bennett .............. H04B 10/2581
398/44
2013/0343717 A1\* 12/2013 Tachibana ................ G02B 6/44
385/141

FOREIGN PATENT DOCUMENTS

| JP | 3902201 B2 | 4/2007 |
|----|------------|--------|
| JP | 4341872 B2 | 10/2009 |

\* cited by examiner

OPTICAL FIBER

CROSS-REFERENCE TO RELATED APPLICATION

The present application claims the benefit of priority of Japanese Patent Application No. 2015-095987, filed on May 8, 2015, which is incorporated herein by reference.

BACKGROUND

Technical Field

The present invention relates to an optical fiber.

Related Art

In the field of interconnecting, optical fibers are required to have such fatigue resistance that even when the optical cable is bent to, for example, a radius as small as 1.5-2 mm, the optical fiber in this optical cable is less apt to fatigue.

For obtaining satisfactory fatigue resistance, it is effective to reduce the glass-fiber diameter of the optical fiber. Although optical fibers usually have a glass-fiber diameter of 125 μm, use of an optical fiber having a glass-fiber diameter smaller than 125 μm can improve the fatigue resistance (see, for example, Japanese Patent No. 3902201, Japanese Patent No. 3518089, and U.S. Pat. No. 8,189,978).

Japanese Patent No. 4341872 describes a liquid radiation-curable resin composition for the inner primary coating of optical fibers, the resin composition containing an oligomer having a reactive group at each of both ends.

SUMMARY OF THE INVENTION

Reducing the glass-fiber diameter of optical fibers results in a deterioration in resistance to lateral pressure. This is because when lateral pressure is applied to the optical fiber, micro-bending occurs at the interface between the core and the cladding to cause an increase in transmission loss. Especially in the case of using a multimode fiber as the glass fiber, the optical fiber shows poorer resistance to lateral pressure as compared with the case of using a single-mode fiber and, hence, undergoes a larger increase in transmission loss due to diameter reduction. Effective for improving the lateral-pressure resistance of optical fibers is to reduce the Young's modulus of the primary resin coating layer.

According to the technique described in Japanese Patent No. 4341872, it is necessary to reduce the Young's modulus of the primary resin coating layer of an optical fiber by heightening the molecular weight of the oligomer. In this case, however, this primary resin coating layer has reduced toughness, and the polymer chains in the resin fatigue irreversibly when the optical fiber is stretched. Accumulation of such fatigues results in the generation of voids. The voids impair the low-temperature transmission loss characteristic (low-temperature characteristics) of the optical fiber.

An object of the present invention is to provide an optical fiber which employs a multimode fiber having a diameter smaller than 125 μm and which has satisfactory resistance to lateral pressure and satisfactory low-temperature characteristics.

The present invention provides an optical fiber including a glass fiber, a primary resin coating layer which covers the periphery of the glass fiber, and a secondary resin coating layer which covers the periphery of the primary resin coating layer. The glass fiber is a multimode fiber having a core diameter of 40-60 μm and a cladding diameter of 90-110 μm. The primary resin coating layer is a layer formed by curing a curable resin composition which includes one or more oligomers, one or more monomers, and a reaction initiator, the curable resin composition containing a one-end-capped oligomer in an amount of 30% by mass or larger based on all the oligomers.

The glass fiber included in the optical fiber of the present invention is a multimode fiber which is excellent in terms of resistance to lateral pressure and low-temperature characteristics, since the primary coating, even when having a reduced Young's modulus, is inhibited from generating voids.

DETAILED DESCRIPTION

Explanation of Embodiments of the Invention

The optical fiber of the present invention is (1) an optical fiber including a glass fiber, a primary resin coating layer which covers the periphery of the glass fiber, and a secondary resin coating layer which covers the periphery of the primary resin coating layer, wherein the glass fiber is a multimode fiber having a core diameter of 40-60 μm and a cladding diameter of 90-110 μm, and the primary resin coating layer is a layer formed by curing a curable resin composition which includes one or more oligomers, one or more monomers, and a reaction initiator, the curable resin composition containing a one-end-capped oligomer in an amount of 30% by mass or larger based on all the oligomers.

The glass fibers of general optical fibers have a cladding diameter of 125 μm. However, by reducing the cladding diameter to 90-110 μm as in the present invention, the glass fiber can be rendered less apt to fatigue when bent to a small radius.

In addition, the inclusion of a one-end-capped oligomer in the curable resin composition for forming the primary resin coating layer in an amount of 30% by mass or larger based on all the oligomers is presumed to produce the following effects.

Figure 1A:
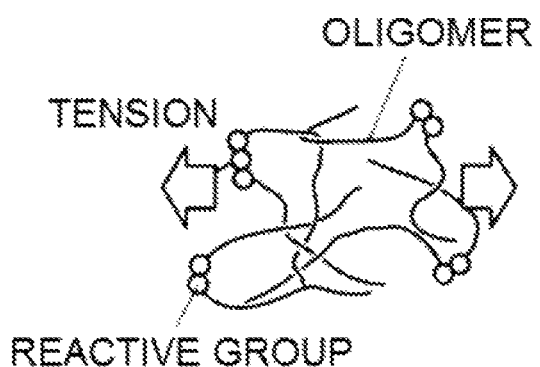
FIG. 1A and FIG. 1B are schematic cross-sectional views that each illustrate the state in which oligomer chains derived from a one-end-capped oligomer are entangled in the primary resin coating layer of an embodiment of the optical fiber of the present invention.
Figure 1B:
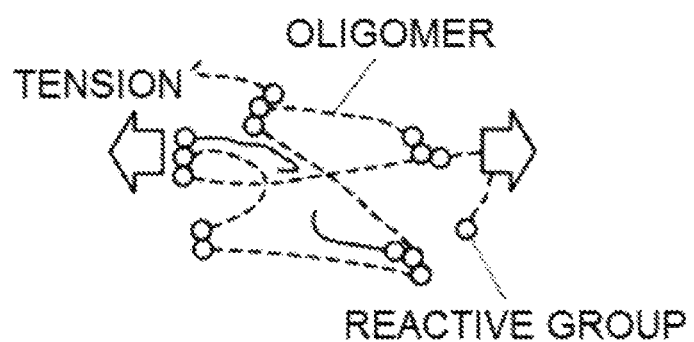

Since the oligomers include an oligomer in which one end is a nonreactive group, the oligomers have a smaller number of crosslinking sites as compared with conventional oligomers (in which there is a reactive group at each of both ends). The smaller number of crosslinking sites enable the primary resin coating layer to have a reduced Young's modulus. Furthermore, as shown in FIG. 1A, the nonreactive(capped)-end-side portions of oligomer chains (continuous lines) derived from the one-end-capped oligomer (in the figure, those portions are the continuous-line ends which have no symbol o affixed thereto) are entangled with oligomer chains derived from another oligomer, or the oligomer chains are electrically bonded to one another. This "entanglement" or "electrical bonding" constitutes pseudo crosslinking. This pseudo crosslinking is different from the true crosslinking, such as that shown in FIG. 1B, formed by bonding between the reactive groups of a both-end-reactive oligomer (oligomer chains are broken lines), and the molecular chains extend, without rupturing, upon application of tension thereto and return to the original state upon removal of the tension. As a result, the primary resin coating layer is inhibited from generating voids therein and an increase in transmission loss at low temperatures is avoided.

(2) It is preferable that the primary resin coating layer should have a Young's modulus of 0.5 MPa or less. This is because this primary resin coating layer makes it possible to obtain satisfactory resistance to lateral pressure.

(3) It is preferable that the optical fiber should have a non-strippable resin coating layer disposed between the cladding and the primary resin coating layer and that the non-strippable resin layer should have an outer diameter of 122-128 μm.

The term "non-strippable resin coating layer" means a resin layer which is tenaciously adherent to the cladding.

In general, when connecting an optical fiber to an optical connector, the primary resin coating layer and secondary resin coating layer of the optical fiber are removed to expose the cladding and the exposed portion is inserted into a fiber insertion hole of the optical connector. General optical fibers employ glass fibers having a cladding diameter of 125 μm. The fiber insertion holes of general optical connectors also have been designed to accommodate glass fibers having a diameter of 125 μm. In contrast, since the optical fiber of the present invention employs as the glass fiber a multimode fiber having a cladding diameter of 90-110 μm, the portion where the primary resin coating layer, secondary resin coating layer, etc. have been removed to expose the glass fiber surface is not suitable for connection to general optical connectors. Hence, by disposing a non-strippable resin coating layer having an outer diameter of 122-128 μm between the cladding and the primary resin coating layer, the optical fiber of the present invention is made suitable for connection to general optical connectors.

The term "non-strippable resin coating layer" means a resin layer which is tenaciously adherent to the cladding. When connecting the optical fiber to an optical connector, the first resin coating layer and the second resin coating layer are removed and the non-strippable resin remains on the cladding.

(4) It is preferable that the glass fiber should have a portion (trench) having a lower refractive index than the cladding, on the periphery of the core, that the core should have a refractive index difference (with respect to the cladding) of 0.7% or larger and the trench should have a refractive index difference (with respect to the cladding) of −0.2% or less, and that the trench should have a radial-direction width of 1 μm or larger. This is because the presence of the trench within the glass fiber further reduces the bending loss (micro-bending loss) of the optical fiber.

(5) It is preferable that the trench should have a refractive index difference of −0.4% or less. This is because bending loss (micro-bending loss) is even more reduced thereby.

(6) It is preferable that when the transmission loss of the optical fiber wound on a mandrel with a diameter of 15 mm so as to make two turns is measured using signal light having a wavelength of 850 nm and is compared with the transmission loss (measured using signal light having a wavelength of 850 nm) of the optical fiber wound into a loose coreless bundle having a diameter of 30 cm, then the former transmission loss should not be higher by more than 0.2 dB than the latter transmission loss. This optical fiber can transmit signal light even when bent to small radii.

(7) It is preferable that when the transmission loss of the optical fiber wound on a mandrel with a diameter of 4 mm so as to make 0.5 turns is measured using signal light having a wavelength of 850 nm and is compared with the transmission loss (measured using signal light having a wavelength of 850 nm) of the optical fiber wound into a loose coreless bundle having a diameter of 30 cm, then the former transmission loss should not be higher by more than 2.5 dB than the latter transmission loss. This optical fiber can transmit signal light even when bent to extremely small radii.

Details of Embodiments of the Invention

Embodiments of the present invention are explained below in detail by reference to FIG. 2A and FIG. 2B.

(Outline of the Optical Fiber)

Figure 2A:
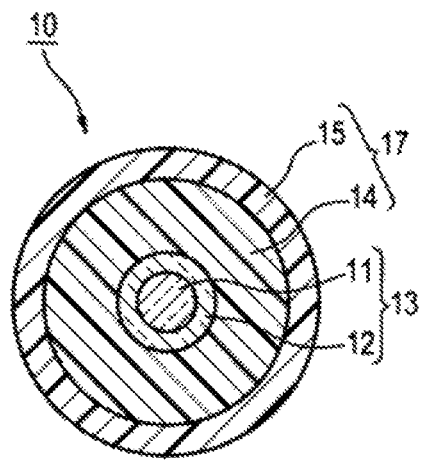
FIG. 2A and FIG. 2B are schematic cross-sectional views that illustrate embodiments of the optical fiber of the present invention.

FIG. 2A is a schematic cross-sectional view which illustrates one embodiment of the optical fiber of the present invention.

The optical fiber 10 as shown in FIG. 2A includes a glass fiber 13 and, disposed on the periphery thereof, a resin coating layer 16 which includes an inner layer 14 and an outer layer 15 that each have been formed from an ultraviolet-curable resin composition (hereinafter also referred to simply as "resin composition"). The glass fiber 13 is configured of a core 11 and a cladding 12. For example, silica glass to which germanium has been added can be used as the core 11, and either pure silica glass or silica glass to which fluorine has been added can be used as the cladding 12.

Figure 2B:
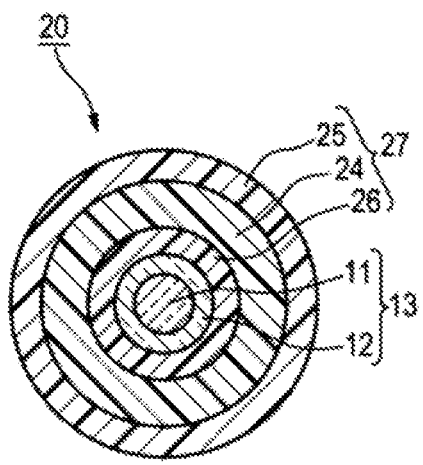

FIG. 2B is a schematic cross-sectional view that illustrates another embodiment of the optical fiber of the present invention.

The optical fiber 20 shown in FIG. 2B includes a glass fiber 23 and, disposed on the periphery thereof, a non-strippable resin coating layer 26 formed from an ultraviolet-curable resin composition (hereinafter also referred to simply as "resin composition") and a resin coating layer 27 which includes an inner layer 24 and an outer layer 25. The glass fiber 23 is the same as shown in FIG. 2A.

In FIGS. 2A and 2B, the diameter of the glass fiber 13 is about 100 μm. The resin coating layer 17 is composed of two layers, i.e., an inner layer 14 and an outer layer 15, while the resin coating layer 27 is composed of three layers, i.e., a non-strippable resin coating layer 26, an inner layer 24, and an outer layer 25. The inner layers 14 and 24 each have an outer diameter of usually about 180-210 μm, and the outer layers 15 and 25 each have an outer diameter of usually about 220-260 μm.

(Glass Fiber)

The glass fiber 13 used in one embodiment include a core 11 of the GI (graded index) type.

Figure 3A:
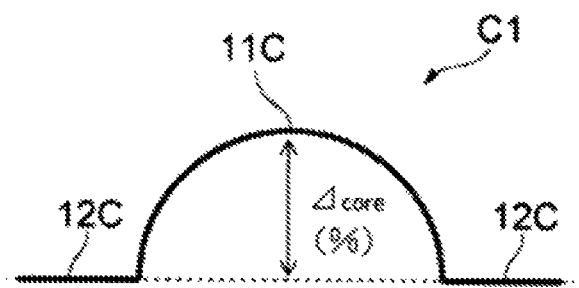
FIG. 3A and FIG. 3B are views that show examples of the refractive-index profile of the glass fiber used in an embodiment of the optical fiber of the present invention.

The refractive index profile C1 of the glass fiber 13 having a core 11 of the GI type is shown in FIG. 3A. The refractive index profile C1 shown in FIG. 3A includes a core refractive-index distribution 11C, which is the refractive index distribution of the core 11, and a cladding refractive-index distribution 12C, which is the refractive index distribution of the cladding 12. The cladding is lower in refractive index than the core.

Figure 3B:
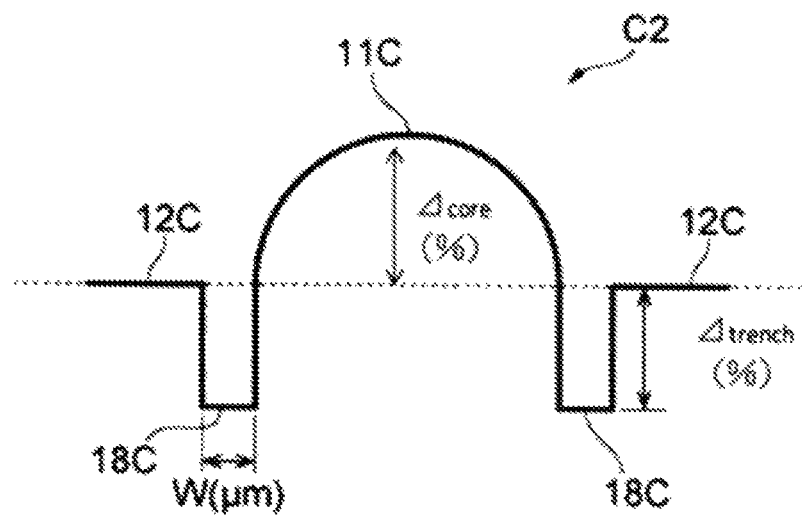

FIG. 3B shows a refractive index profile C2 of a glass fiber which includes a core of the GI (graded index) type and has a trench (not shown in FIG. 2).

The refractive index profile C2 of FIG. 3B has a structure in which a trench refractive-index distribution 18C, which is the refractive index distribution of the trench, adjoins the core refractive-index distribution 11C. The trench has a lower refractive index than the cladding.

The trench is effective in reducing the macro-bending loss and micro-bending loss of the optical fiber. For applications where communication errors occurring upon bending to a small radius are permissible so long as the communication is restored by eliminating the bending, use may be made of a glass fiber having the refractive index profile C1 shown in FIG. 3A. For applications where no communication errors are permissible even when the optical fiber is bent to small radii, it is preferred to use a glass fiber having the refractive index profile C2 including the trench refractive-index distribution 18C.

In the case of using a glass fiber having a trench, it is preferable that the core should have a refractive index difference (Δcore) of 0.7% or larger, the trench should have a refractive index difference (Δtrench) of −0.2% or less, and the trench should have a thickness of 1 μm or larger. In this case, the refractive index difference of the trench is more preferably −0.4% or less, even more preferably −0.5% or less.

It is preferable that the glass fiber 13 used in this embodiment should have a numerical aperture (NA) of 0.15-0.30. In cases when the numerical aperture thereof is within that range, it is possible to reduce the coupling loss caused by the coupling of the optical fiber to, for example, a light source such as a VCSEL (vertical cavity surface emitting laser) or a photodetector such as a photodiode.

(Resin Compositions)

In the embodiments, the resin compositions for forming the non-strippable resin coating layer 26, inner layers 14 and 24, and outer layers 15 and 25 each include one or more oligomers, one or more monomers, and a reaction initiator.

(Oligomers)

Examples of the oligomers include urethane acrylates, epoxy acrylates, or mixtures of these. Preferred are urethane acrylates.

Examples of the urethane acrylates include ones obtained by reacting a polyol compound, a polyisocyanate compound, and a hydroxyl-containing acrylate compound.

Examples of the polyol compound include poly(tetramethylene glycol), poly(propylene glycol), and a bisphenol A/ethylene oxide adduct diol. Examples of the polyisocyanate compound include 2,4-tolylene diisocyanate, 2,6-tolylene diisocyanate, and isophorone diisocyanate. Examples of the hydroxyl-containing acrylate compound include 2-hydroxyethyl acrylate, 2-hydroxypropyl acrylate, 2-hydroxybutyl acrylate, 1,6-hexanediol monoacrylate, pentaerythritol triacrylate, 2-hydroxypropyl acrylate, and tripropylene glycol diacrylate.

The resin composition for forming the inner layer 14 contains a one-end-capped oligomer in an amount of 30% by mass or larger based on all the oligomers. In this description of the present invention a nonreactive terminus of an oligomer is called a "capped end". One-end-capped oligomer means an oligomer which has a nonreactive terminus and a reactive group on the other end. The nonreactive terminus may be obtained by deactivating a reactive group in the terminus. The content of this one-end-capped oligomer is preferably 40% by mass or larger, more preferably 80% by mass or larger.

It is preferable that the reactive end of this one-end-capped oligomer should be a hydroxyethyl acrylate residue.

Either a lower alcohol having up to 5 carbon atoms or a silane coupling agent has been bonded to the other end. As the silane coupling agent, use can be made of various silane coupling agents having a reactive functional group which is an amino, epoxy, (meth)acryloyl, vinyl, or mercapto group.

(Monomers)

Examples of the monomers include N-vinyl monomers having a cyclic structure, such as, for example, N-vinylpyrrolidone, N-vinylcaprolactam, and acryloylmorpholine. These monomers are preferred because the resin composition containing any of these monomers has an improved curing rate. Usable besides these are monofunctional monomers such as isobornyl acrylate, tricyclodecanyl acrylate, benzyl acrylate, dicyclopentanyl acrylate, 2-hydroxyethyl acrylate, nonylphenyl acrylate, phenoxyethyl acrylate, and poly(propylene glycol) monoacrylate and polyfunctional monomers such as poly(ethylene glycol) diacrylate, tricyclodecanediyldimethylene diacrylate, or bisphenol A/ethylene oxide adduct diol diacrylates, trimethylolpropane triacrylate, tripropylene glycol diacrylate, 1,6-hexanediol diacrylate, and 1,9-nonanediol diacrylate.

(Reaction Initiator)

Examples of the reaction initiator include 1-hydroxycyclohexyl phenyl ketone, 2,2-dimethoxy-2-phenylacetophenone, 1-(4-isopropylphenyl)-2-hydroxy-2-methylpropan-1-one, 2,4,4-trimethylpentylphosphine oxide, 2,4,4-trimethylbenzoyldiphenylphosphine oxide, 2-methyl-1-[4-(methylthio)phenyl]-2-morpholinopropan-1-one (Irgacure 907, manufactured by Ciba Specialty Chemicals Co.), and 2,4,6-trimethylbenzoyldiphenylphosphine oxide (Lucirin TPO, manufactured by BASF A.G.).

(Other Ingredients)

The resin compositions may contain a silane coupling agent, an antioxidant, a photo-acid generator, a photosensitizer, etc. It is preferable that especially the resin compositions for forming the non-strippable resin coating layer 26 and inner layer 14 or 24, which are in contact with the glass fiber boundary, should contain a silane coupling agent.

(Other Properties)

It is preferable that the optical fibers 10 and 20 according to the embodiments each should have the following properties. In cases when the optical fiber 10 or 20 is wound on a mandrel with a diameter of 15 mm so as to make two turns, the increase in the loss of transmission of signal light having a wavelength of 850 nm is preferably 0.2 dB or less (as compared with the transmission loss of the optical fiber wound into a loose bundle). It is more preferable that in cases when the optical fiber 10 or 20 is wound on a mandrel with a diameter of 4 mm so as to make 0.5 turns, the increase in the loss of transmission of signal light having a wavelength of 850 nm should be 2.5 dB or less.

It is preferable that the non-strippable resin coating layer 26 in one of the embodiments should have a Young's modulus of 600 MPa or higher. So long as the Young's modulus of the non-strippable resin coating layer 26 is 600 MPa or higher, this resin coating layer 26 does not deform in optical connectors. Thus, the optical fiber 20 undergoes no axis dislocation, and the optical properties are prevented from becoming worse.

It is preferable that the outer layers 15 and 25 should each have a Young's modulus of 400-1,500 MPa. In cases when the inner layer 24 and outer layer 25 which cover the non-strippable resin coating layer 26 are to be removed with a stripper (for example, JR-25, manufactured by Sumitomo Electric Industries, Ltd.) for the optical fiber 20, the non-strippable resin coating layer 26 is kept tenaciously adherent to the underlying layer (the cladding 12 in this embodiment) and only the layers (the inner layer 24 and the outer layer 25 in this embodiment) overlying the non-strippable resin coating layer 26 are removed. The strength of adhesion between the cladding 12 and the non-strippable resin coating layer 26, as measured by a 90-degree peel test (a glass plate is coated with the non-strippable resin film and this film is peeled from the glass plate), is, for example, 3 N/m or higher, preferably 15 N/m or higher.

In this embodiment, the inner layer 14 has a Young's modulus of 0.5 MPa or less, preferably 0.3 MPa or less.

The Young's modulus of the inner layer (primary coating layer) can be measured at 23° C. by a pullout modulus test. Specifically, the resin coating layer 17 or 27 of the optical fiber 10 or 20 is incised with a razor blade or the like to cut the resin coating layer 17 or 27. This resin coating layer 17 or 27 (i.e., the inner layer 14 or 24 and the outer layer 15 or 25) is fixed, and the glass fiber 13 is pulled out. The stress imposed on the inner layer 14 or 24 is determined from the amount in which the inner layer 14 or 24 undergoes an elastic deformation before the glass fiber 13 is pulled out and from the force used for pulling the glass fiber 13.

In the case of forming a primary resin coating layer having a low Young's modulus, a conventional method therefor is to increase the molecular weight of the oligomer to be incorporated into a resin composition for forming the primary resin coating layer, thereby forming a sparse polymer network (lowering the density of crosslinking sites). However, the resin coating layer formed by this method, although having an improved elongation, has decreased strength and has a problem in that polymer chains in the resin undergo irreversible cleavages due to tension and accumulation thereof results in void generation in the resin coating layer during handling.

In the case where there are no voids, the transmission loss at −40° C. is lower than the transmission loss measured at 23° C. In the case where there are voids, however, the transmission loss at −40° C. is higher than the transmission loss measured at 23° C.; the presence of voids enhances the low-temperature transmission loss.

In this embodiment, in order to obtain an optical fiber in which the primary resin coating layer is inhibited from generating voids even when having a reduced Young's modulus and which is thereby prevented from deteriorating in low-temperature transmission loss, a resin composition containing a one-end-capped oligomer in an amount of 30% by mass or larger based on all the oligomers was used for forming the inner layer 14 or 24. As a result, the inner layer 14 or 24 can be made to have a reduced Young's modulus, and the optical fiber is stretched, without rupturing, upon application of tension thereto and returns to the original state upon removal of the tension. Consequently, this optical fiber does not deteriorate in transmission loss at low temperatures.

EXAMPLES

The results of evaluation tests to which Examples according to the present invention and Comparative Examples were subjected are shown below to explain the present invention in more detail. The present invention should not be construed as being limited to the following Examples.

[Production of Optical Fibers 10 and 20]

As glass fibers 13, use was made of glass fibers which each had a core diameter of 50 µm, a cladding diameter in the range (90-110 µm) shown in Tables 1 and 2, and a refractive index profile shown in the Tables 1 and 2. The resin composition for forming a non-strippable resin coating layer, resin composition for inner-layer formation, and resin composition for outer-layer formation which respectively had the makeups shown below were applied to the peripheral surface of each glass fiber 13 and cured to form resin coating layers. Thus, optical fibers were produced. In the optical fibers each including the non-strippable resin coating layer, the outer diameter of the non-strippable resin coating layer was regulated to 125 µm. The outer diameter of the inner layer was regulated to 200 µm, and the outer diameter of the outer layer was regulated to 245 µm.

(Resin Composition for Forming Non-strippable Resin Coating Layer)

| | |
|---|---|
| Urethane acrylate oligomer obtained by reacting diisocyanate and hydroxy acrylate with poly(propylene glycol)diol | 50 parts by mass |
| Bisphenol A epoxy acrylate | 10 parts by mass |
| Isobornyl acrylate | 37 parts by mass |
| 2,4,4-Trimethylbenzoyldiphenylphosphine oxide (reaction initiator) | 2 parts by mass |
| 3-Acryloxypropyltrimethoxysilane | 1 part by mass |

(Resin Composition for Inner-Layer Formation)

| | |
|---|---|
| Urethane acrylate oligomer(s) having the makeup shown in Table 2 | 65 parts by mass |
| Ethoxynonylphenyl acrylate | 5 parts by mass |
| Isobornyl acrylate | 20 parts by mass |
| N-Vinylcaprolactam | 6 parts by mass |
| 2,4,4-Trimethylbenzoyldiphenylphosphine oxide (reaction initiator) | 1 part by mass |
| 3-Acryloxypropyltrimethoxysilane | 1 part by mass |
| Irganox 1035 (antioxidant) | 0.8 parts by mass |
| 2-Hydroxy-4-methoxybenzophenone (light stabilizer) | 0.2 parts by mass |

(Resin Composition for Outer-layer Formation)

| | |
|---|---|
| Urethane acrylate oligomer obtained by reacting diisocyanate and hydroxy acrylate with poly(propylene glycol)diol | 50 parts by mass |
| Bisphenol A epoxy acrylate | 18 parts by mass |
| Isobornyl acrylate | 10 parts by mass |
| N-Vinylpyrrolidone | 5 parts by mass |
| Ethoxynonylphenyl acrylate | 15 parts by mass |
| 2,4,4-Trimethylbenzoyldiphenylphosphine oxide (reaction initiator) | 2 parts by mass |

[Evaluation of the Optical Fibers 10 and 20]

Each of the optical fibers produced was subjected to the following evaluation tests (Young's modulus of the inner layer, resistance to lateral pressure, low-temperature transmission loss, and bending loss). The results thereof are shown in Tables 1 and 2 below.

<Young's Modulus of Inner Layer>

The Young's modulus of the inner layer 14 or 24 was measured by a pullout modulus test at 23° C. The results thereof are shown in Tables 1 and 2 below.

With respect to the evaluation of resistance to lateral pressure, low-temperature transmission loss, and bending loss shown below, an LED having an emission wavelength of 850 nm was connected to each optical fiber to be examined and the light was caused to enter the optical fiber under conditions according to IEC 61280-4-1 to measure the transmission loss of the sample.

<Resistance to Lateral Pressure (Micro-Bending Characteristics)>

Figures 4A, 4B:
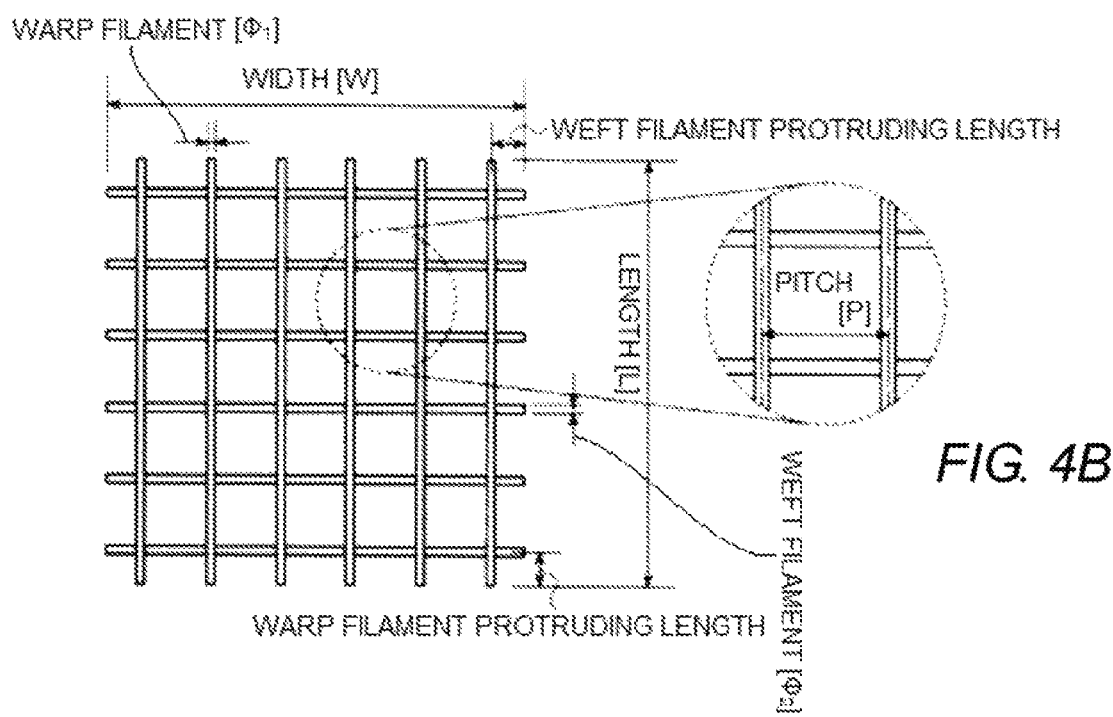
FIG. 4A is a view that illustrates the structure of a metal mesh for use in the evaluation of lateral-pressure resistance in the Examples.
FIG. 4B is a partly enlarged view of FIG. 4A.

The optical fiber 10 or 20 having a length of 500 m was wound at a tension of 80 g around a bobbin (core diameter, 30 cm) on which a plain-weave metal mesh shown in FIG. 4A and FIG. 4B and having a warp filament diameter of 50 μm, weft filament diameter of 50 μm, and pitch of 150 μm had been wound. The transmission loss of this wound optical fiber for the signal light having a wavelength of 850 nm was measured. Meanwhile, the same optical fiber 10 or 20 was wound into a bundle 30 cm in cross-sectional diameter, without being wound around any bobbin, and the transmission loss of this wound optical fiber for the signal light having a wavelength of 850 nm was measured. This transmission loss was subtracted from the transmission loss of that optical fiber wound around the bobbin, thereby calculating a difference in transmission loss. The case where the difference in transmission loss was less than 3.0 dB/km is indicated by A, the case where the difference is 3.0 or larger but less than 8.0 is indicated by B, and the case where the difference is 8.0 or larger is indicated by C; A and B were regarded as acceptable. The results thereof are shown in Tables 1 and 2 below.

<Low-Temperature Transmission Loss (Low-Temperature Characteristics)>

Using a capstan device and a roller, a tension was applied to the optical fiber 10 or 20 so that the optical fiber underwent an elongation strain of 1.5%. This optical fiber 10 or 20 to which the tension was being applied was examined for the property of transmitting the signal light having a wavelength of 850 nm, under the temperature conditions of each of 23° C. and −40° C. The optical fiber 10 or 20 was thus evaluated for transmission loss at 23° C. and −40° C. The case where the difference between the transmission loss at −40° C. and the transmission loss at 23° C. (transmission loss difference) was less than 0 dB/km was rated as A, the case where the difference was 0 dB/km or larger but less than 0.2 dB/km was rated as B, and the case where the difference was 0.2 dB/km or larger was rated as C. The ratings A and B were regarded as acceptable. The results thereof are shown in Tables 1 and 2 below.

<Bending Loss (1) (Macro-Bending Characteristics)>

The optical fiber 10 or 20 was wound on a mandrel with a diameter of 15 mm so as to make two turns, and the resultant increase in transmission loss for the signal light having a wavelength of 850 nm was determined. (The increase is from the transmission loss of the same optical fiber in the state of having been wound into a bundle having a diameter of 30 cm.) The case where the increase in transmission loss was less than 0.1 dB was rated as A, the case where the increase was 0.1 dB or larger but less than 0.2 dB was rated as B, and the case where the increase was 0.2 dB or larger was rated as C. The ratings A and B were regarded as acceptable. The results thereof are shown in Tables 1 and 2 below.

<Bending Loss (2) (Macro-Bending Characteristics)>

The optical fiber was wound on a mandrel with a diameter of 4 mm so as to make 0.5 turns, and the resultant increase in transmission loss for the signal light having a wavelength of 850 nm was determined. (The increase is from the transmission loss of the same optical fiber in the state of having been wound into a bundle having a diameter of 30 cm.) The case where the increase in transmission loss was less than 1.0 dB was rated as A, the case where the increase was 1.0 dB or larger but less than 2.5 dB was rated as B, and the case where the increase was 2.5 dB or larger was rated as C. The ratings A and B were regarded as acceptable. The results thereof are shown in Tables 1 and 2 below.

In the following Tables 1 and 2, Nos. 1 to 13 are Examples and Nos. 21 to 31 are Comparative Examples.

TABLE 1

| No. | | 1 | 2 | 3 | 4 | 5 | 6 | 7 | 8 | 9 | 10 | 11 | 12 | 13 |
|---|---|---|---|---|---|---|---|---|---|---|---|---|---|---|
| Urethane acrylate oligomer in resin composition for inner-layer formation (see Table 3) | | D | C | B | A | C | D | C | B | A | C | B | C | B |
| Refractive index profile of glass fiber (see Table 4) | | A | A | A | A | B | B | B | B | B | C | C | D | D |
| Cladding diameter (μm) | | 90 | 100 | 100 | 110 | 100 | 100 | 100 | 100 | 100 | 100 | 100 | 100 | 100 |
| Young's modulus of inner layer (MPa) | | 0.5 | 0.3 | 0.2 | 0.1 | 0.3 | 0.5 | 0.3 | 0.2 | 0.1 | 0.3 | 0.2 | 0.3 | 0.2 |
| Micro-bending characteristics | | B | B | B | A | A | B | A | A | A | A | A | B | A |
| (dB/km) | | 7.9 | 4.4 | 3.1 | 2.4 | 1.9 | 4.4 | 2.1 | 1.1 | 0.6 | 2.9 | 1.7 | 4.0 | 2.8 |
| Low-temperature characteristics | | A | A | A | A | A | A | A | A | A | A | A | A | A |
| (dB/km) | | <0.00 | <0.00 | <0.00 | <0.00 | <0.00 | <0.00 | <0.00 | <0.00 | <0.00 | <0.00 | <0.00 | <0.00 | <0.00 |
| Macro-bending characteristics | 15-mm diameter × 2 turns (dB) | C | C | C | C | A | A | A | A | A | A | A | B | B |
| | | 0.58 | 0.58 | 0.58 | 0.58 | 0.04 | 0.04 | 0.04 | 0.04 | 0.04 | 0.02 | 0.02 | 0.14 | 0.14 |
| | 4-mm diameter × 0.5 turns (dB) | C | C | C | C | A | A | A | A | A | B | B | C | C |
| | | 6.3 | 6.3 | 6.3 | 6.3 | 0.7 | 0.7 | 0.7 | 0.7 | 0.7 | 2.2 | 2.2 | 3.7 | 3.7 |

TABLE 2

| No. | 21 | 22 | 23 | 24 | 25 | 26 | 27 | 28 | 29 | 30 | 31 |
|---|---|---|---|---|---|---|---|---|---|---|---|
| Urethane acrylate oligomer in resin composition for inner-layer formation (see Table 3) | F | E | G | F | F | E | G | F | G | F | G |
| Refractive index profile of glass fiber (see Table 4) | A | A | A | B | B | B | B | C | C | D | D |
| Cladding diameter (μm) | 100 | 100 | 100 | 100 | 100 | 100 | 100 | 100 | 100 | 100 | 100 |
| Young's modulus of inner layer (MPa) | 0.9 | 0.7 | 0.3 | 0.9 | 0.9 | 0.7 | 0.3 | 0.9 | 0.3 | 0.9 | 0.3 |
| Micro-bending characteristics | C | C | B | C | C | C | A | C | A | C | B |
| (dB/km) | 15.0 | 11.7 | 4.4 | 10.1 | 10.6 | 8.3 | 2.1 | 12.0 | 2.9 | 13.7 | 4.0 |
| Low-temperature characteristics | A | A | C | A | A | A | C | A | C | A | C |
| (dB/km) | <0.00 | <0.00 | 3.5 | <0.00 | <0.00 | <0.00 | 2.7 | <0.00 | 2.9 | <0.00 | 3.2 |

TABLE 2-continued

| | No. | 21 | 22 | 23 | 24 | 25 | 26 | 27 | 28 | 29 | 30 | 31 |
|---|---|---|---|---|---|---|---|---|---|---|---|---|
| Macro-bending characteristics | 15-mm diameter × 2 turns (dB) | C 0.58 | C 0.58 | C 0.58 | A 0.04 | A 0.04 | A 0.04 | A 0.04 | A 0.02 | A 0.02 | B 0.14 | B 0.14 |
| | 4-mm diameter × 0.5 turns (dB) | C 6.3 | C 6.3 | C 6.3 | A 0.7 | A 0.7 | A 0.7 | A 0.7 | B 2.2 | B 2.2 | C 3.7 | C 3.7 |

TABLE 3

Makeup of urethane acrylate oligomer for resin composition for inner-layer formation

| | A | B | C | D | E | F | G |
|---|---|---|---|---|---|---|---|
| One-end-capped oligomer | 100 | 80 | 60 | 30 | 20 | 0 | 0 |
| Both-ends-reactive oligomer | 0 | 20 | 40 | 70 | 80 | 100 | 100 |
| Number-average molecular weight | 4500 | 4500 | 4500 | 4500 | 4500 | 4500 | 6500 |

TABLE 4

Refractive index profile of glass fiber

| | A | B | C | D |
|---|---|---|---|---|
| Structure | FIG. 2A | FIG. 2B | FIG. 2B | FIG. 2B |
| Refractive index difference of core | 1.0% | 1.0% | 0.9% | 1.0% |
| Refractive index difference of trench | — | −0.60% | −0.40% | −0.20% |
| Trench width | — | 3 μm | 6 μm | 3 μm |

The structures of the one-end-capped oligomer and both-ends-reactive oligomer shown in Table 3 are as follows.

One-end-capped Oligomer:

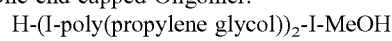

Both-ends-reactive Oligomer:

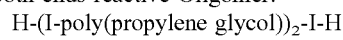

In the expressions of oligomers, H represents a residue of hydroxyethyl acrylate, I represents a residue of isophorone diisocyanate, MeOH represents a residue of methanol, and poly(propylene glycol) represents a residue of poly(propylene glycol).

The optical fibers Nos. 1 to 13 shown in Table 1 were each able to combine micro-bending characteristics and low-temperature characteristics, since the resin compositions for inner-layer formation each had contained a one-end-capped oligomer in an amount of 30% by mass or larger based on all the oligomer(s). In contrast, the optical fibers Nos. 21 to 31 shown in Table 2 were each rated as C in terms of either micro-bending characteristics or low-temperature characteristics.

Furthermore, the optical fibers Nos. 5 to 13 shown in Table 1 were able to be rated as B or higher in terms of the macro-bending characteristics regarding 15-mm diameter×2 turns, since these optical fibers each employed a glass fiber which had a trench and in which the trench had a refractive index difference of −0.2% or less. Of these, Nos. 5 to 11 shown in Table 1 were able to be rated as B or higher also in terms of the macro-bending characteristics regarding 4-mm diameter×0.5 turns, since these optical fibers each employed a glass fiber which had a trench and in which the trench had a refractive index difference of −0.4% or less. Moreover, Nos. 5 to 9 shown in Table 1 were able to be rated as A in terms of both the macro-bending characteristics regarding 15-mm diameter×2 turns and the macro-bending characteristics regarding 4-mm diameter×0.5 turns, since these optical fibers each employed a glass fiber which had a trench and in which the trench had a refractive index difference of −0.5% or less.

Furthermore, the optical fibers Nos. 2 to 5 and Nos. 7 to 13 shown in Table 1 had even better micro-bending characteristics, since the resin compositions for inner-layer formation each had contained a one-end-capped oligomer in an amount of 60% by mass or larger based on all the oligomer(s) and because the inner layers each hence had a Young's modules of 0.3 MPa or less.

The invention claimed is:

1. An optical fiber comprising a glass fiber which comprises a core and a cladding, a primary resin coating layer which covers a periphery of the glass fiber, and a secondary resin coating layer which covers a periphery of the primary resin coating layer, wherein
   the glass fiber is a multimode fiber having a core diameter of 40-60 μm and a cladding diameter of 90-110 μm, and
   the primary resin coating layer is a layer formed by curing a curable resin composition which comprises oligomers, monomers, and a reaction initiator, the curable resin composition containing a one-end-capped oligomer which has a nonreactive terminus and a reactive group on the other end in an amount of 30% by mass or larger based on all the oligomers.

2. The optical fiber according to claim 1, wherein the primary resin coating layer has a Young's modulus of 0.5 MPa or less.

3. The optical fiber according to claim 1, which has a non-strippable resin coating layer disposed between the cladding and the primary resin coating layer, the non-strippable resin layer having an outer diameter of 122-128 μm.

4. The optical fiber according to claim 1, wherein the glass fiber has, on a periphery of the core, a trench which is a portion having a lower refractive index than the cladding, and wherein the core has a refractive index difference of 0.7% or larger, the trench has a refractive index difference of −0.2% or less, and the trench has a radial-direction width of 1 μm or larger.

5. The optical fiber according to claim 4, wherein the trench has a refractive index difference of −0.4% or less.

6. The optical fiber according to claim 1, wherein when a transmission loss of the optical fiber wound on a mandrel with a diameter of 15 mm so as to make two turns is measured using signal light having a wavelength of 850 nm and is compared with a transmission loss, measured using signal light having a wavelength of 850 nm, of the optical fiber wound into a loose and coreless bundle with a diameter of 30 cm, then the former transmission loss is not higher by more than 0.2 dB than the latter transmission loss.

7. The optical fiber according to claim 1, wherein when a transmission loss of the optical fiber wound on a mandrel with a diameter of 4 mm so as to make 0.5 turns is measured using signal light having a wavelength of 850 nm and is compared with a transmission loss, measured using signal light having a wavelength of 850 nm, of the optical fiber wound into a loose and coreless bundle with a diameter of 30 cm, then the former transmission loss is not higher by more than 2.5 dB than the latter transmission loss.

* * * * *